United States Patent [19]

Harmon et al.

[11] Patent Number: 5,361,198
[45] Date of Patent: Nov. 1, 1994

[54] COMPACT WORK STATION CONTROL ROOM

[75] Inventors: Daryl L. Harmon, Enfield; David S. Jamison; Kenneth Scarola, both of Windsor, all of Conn.

[73] Assignee: Combustion Engineering, Inc., Windsor, Conn.

[21] Appl. No.: 863,706

[22] Filed: Apr. 3, 1992

[51] Int. Cl.$^5$ ........................ G05B 19/42; G21C 7/36
[52] U.S. Cl. .................................... 364/188; 376/216
[58] Field of Search ...................... 364/550, 551.1, 494, 364/431.01, 188, 138, 184; 376/216, 217, 218, 245, 249; 375/155, 161

[56] References Cited

U.S. PATENT DOCUMENTS

| | | | |
|---|---|---|---|
| 4,632,802 | 12/1986 | Herbst et al. | 364/184 |
| 4,815,014 | 3/1989 | Lipner et al. | 364/550 |
| 4,902,469 | 2/1990 | Walson et al. | 364/525 |
| 4,957,690 | 9/1990 | Fennern | 364/188 |
| 5,068,080 | 11/1991 | Impink, Jr. et al. | 364/550 |
| 5,227,121 | 7/1993 | Scarola et al. | 376/216 |

*Primary Examiner*—Jerry Smith
*Assistant Examiner*—Jim Trammell
*Attorney, Agent, or Firm*—L. James Ristas; John H. Mulholland

[57] ABSTRACT

Through a localized compact workstation (104), the operator is offered all the monitoring, alarming and control functions which have been previously dispersed over many control panels located throughout the control room (100). The information display hierarchy is composed of an IPSO overview display (122), video display units (108) preferably based on CRT technology and qualified video display units (116) preferably based on solid state flat panel display technology. Associated with each display unit is an individual, independent control module to allow process and component control. One control module (112) supports non-safety control functions and avoids separate controllers for components and process control. Another control module (118) is a qualified system which supports safety system control functions and avoids separate controllers for component and process control. The operator, via a selector matrix (166, 174), designates individual safety channels or process function segments for control and response signal processing.

19 Claims, 16 Drawing Sheets

Fig. 2(a) Copyright © 1991 Combustion Engineering, Inc. All Rights Reserved.

NOTES

- . = PERMISSIVE SWITCHES FOR CHANNEL AND CONTROL SEGMENT INDEPENDENCE
- .. = DEDICATED PUSHBUTTONS
- C = CHANNEL SELECTOR FOR SAFETY SYSTEMS
- S = SEGMENT SELECTOR FOR CONTROL SYSTEMS
- CM = CONTROL MODULE
- QCM = QUALIFIED CONTROL MODULE
- VDU = VIDEO DISPLAY UNIT
- QVDU = QUALIFIED VDU
- DC = DIESEL GENERATOR
- RT = REACTOR TRIP
- ESFAS = ESF ACTUATION SIGNAL
- AAC = ALTERNATE A/C
- TT = TURBINE TRIP
- DPS = DATA PROCESSING SYSTEM
- DIAS = DISCRETE INDICATION AND ALARM SYSTEM

Fig. 2(b)

SELECTED COMPARISON OF COMPACT
WORK STATION CONTROL ROOM WITH KNOWN
ACC CONSOLE CONTROL ROOM

| INTERFACE | ACC | CW |
|---|---|---|
| Indicator Type | | |
| Critical functions | Discrete Indicators | IPSO, QVDU |
| Primary Success Paths | " | IPSO, QVDU |
| Secondary Success Paths | " | QVDU |
| Digital Values | " | IPSO, QVDU |
| Bar Graph Values | " | IPSO, QVDU |
| Trend Direction | " | IPSO, QVDU |
| Trend Values | " | QVDU |
| Level 2 Page Data | " | QVDU |
| Misc. Indications | " | QVDU |
| Continued 24 Hour Operation | " | QVDU |
| Alarm Type | | |
| Critical Functions | Alarm Tiles | IPSO, QVDU |
| Primary Success Path | " | IPSO, QVDU |
| Secondary Success Path | " | QVDU |
| Lists and Messages | " | QVDU |
| Equipment Damage | " | QVDU |
| Personal Hazard | " | QVDU |

Fig. 9

COMPACT WORK STATION CONTROL ROOM

BACKGROUND OF THE INVENTION

The present invention relates to apparatus and methods for monitoring and controlling the operation of nuclear power plants. A portion of the disclosure of this patent document contains material which is subject to copyright protection. The copyright owner has no objection to the facsimile reproduction by anyone of the patent document or the patent disclosure, as it appears in the Patent and Trademark Office, patent file or records, but otherwise reserves all copyright rights whatsoever.

International Patent Application PCT/US89/04899, published as International Publication WO 91/06960 on 16 May, 1991, for "Advanced Nuclear Plant Control Complex", (corresponding to U.S. patent application Ser. No. 430,792 filed Nov. 2, 1989, now U.S. Pat. No. 5,267,277 issued Nov. 30, 1993) and U.S. patent application Ser. No. 676,795, filed Mar. 28, 1991, for "Operator Interface for Plant Component Control System", (now U.S. Pat. No. 5,291,190 issued Mar. 1, 1994) describe and claim apparatus and methods associated with the Nuplex 80+ Advanced Control Complex, a plant-wide computer based monitoring, control and protection system available from ABB Combustion Engineering, Inc., Windsor, Conn. This will hereinafter be referred to as the Advanced Control Complex, or ACC. In said publication, the disclosure of which is hereby incorporated by reference, a master console includes a reactor coolant system panel, a chemical volume control system panel, a reactor core panel, a feedwater control system panel, and a turbine system panel. A separate, safety console is situated at one side of the control room and a separate, auxiliary systems console is situated on the other side of the control room. These three spatially distinct consoles incorporate over a dozen functionally distinct panels.

The ACC was developed based on several key driving forces including improving the Man-Machine Interface (MMI) by a focused effort to utilize human factors engineering concepts, while improving plant safety in a cost-effective manner and complying with U.S. Nuclear Regulatory Commission requirements as well as other desirable criteria, such as those proposed by the Electric Power Research Institute Advanced Light Water Reactor program. These high level design bases were implemented using the following more detailed design principles.

Information processing was structured to reduce the quantity of data that must be mentally processed by the operator (to minimize stimulus overload), while allowing rapid comprehension and ease-of-access to all plant data. Design alarm processing was configured to reduce the number of alarms which are generated, minimize the occurrence of nuisance alarms, and allow the operator to quickly correlate the impact of an alarm on plant safety or performance. Signal multiplexing and data communication networking were incorporated to maximize cost effectiveness for data communications. The maintainability, usability and flexibility of the control complex was expanded to support operational needs over the plant life cycle. Separation between control and monitoring functions was maintained to avoid data communication bottlenecks, improve the MMI and reduce the potential for operator error.

The auxiliary and safety consoles were designed for stand-up operation during other modes of plant operation and emergency conditions. They contain the same types of MMI devices as the master control console (MCC) and are designed to the same common set of display and control criteria.

An Integrated Process Status Overview (IPSO) big board was included to provide the operators and supervisory staff with a quick means of assessing plant status from anywhere in the controlling work space.

Adjacent offices and an overlooking Technical Support Center (TSC) were provided for the operating staff. Each office includes a viewing window into the control room, and a CRT that provides access to the same display pages as are provided by the control room CRT's.

Six major Instrumentation and Controls (I&C) Systems perform the required monitoring and control functions for the plant:

(a) Data Processing System (DPS)—which is based on distributed mini-micro processor architecture;

(b) Discrete Indication and Alarm System (DIAS)—which is based on distributed microprocessor architecture;

(c) Plant Protection System (PPS)—which is based on Programmable Logic Controllers (PLC's) and minicomputers;

(d) Engineered Safety Feature Component Control System (ESF-CCS)—which is based on PLC's;

(e) Process Component Control System (P-CCS)—which is based on PLC's and microprocessors; and (f) Power Control System—which is based on PLC's and distributed microprocessors.

The display of plant information was accomplished via a three level information hierarchy which consists of a big board plant overview mimic (IPSO), discrete indicators implemented with electroluminescent flat panel display technology, and CRTs which incorporate touch screen access. The information hierarchy is designed to critically support the role of the operator so he is more focused on operational tasks, rather than data gathering.

IPSO is a large board display mimic (approx. 1.5×2 meters) which is positioned within the control room so that it is readily visible from all locations within the controlling workspace. The IPSO board provides a comprehensive overview of the current plant state. The display incorporates standard MMI symbology, dynamic display of key plant variables, high priority alarms and plant critical functions into a convenient and easily comprehensible depiction of the current plant state. Plant data for the IPSO display is acquired from both the DPS and DIAS.

The plant status information is presented using a relatively small quantity of easily understood dynamic symbols and variables that are the result of highly processed data. The IPSO display thus relieves the operator of the necessity to scan many parameters located on dispersed control panels and display, while simultaneously trying to mentally assemble a cohesive picture of plant status.

Discrete indicators are the second level in the information display hierarchy. These devices consist of microcomputer driven solid state electroluminescent (ELD) indicators which allow tailoring of display readouts specifically for nuclear applications. Their software basis readily accommodates design changes from initial development throughout the life cycle of the plant. The indicators and microprocessors are part of the DIAS System.

These indicators display single process representation values based on algorithms that validate and average data from multiple sensors, thereby reducing the amount of data the operator must process during various plant conditions. Data is presented in digital, analog and time trend formats.

Touch screens allow menu selection of individual sensor channels, including PAMI, while providing quick and easy data access. This eliminates the need for a separate meter for each sensor by consolidating many like parameters, thereby significantly reducing control panel space requirements.

Key plant parameters are assigned to various ELD discrete indicators which are "spatially dedicated" at various control panel locations, thus offering rapid access to these parameters by the operator since they are continuously displayed at a fixed location within the control room. Further, a CRT selection "soft switch" on each indicator allows direct access to related CRT display pages to improve information recall by the operator.

DIAS is comprised of two channels; DIAS-N and DIAS-P. DIAS-N processes and outputs key plant data representative of critical functions for both safety and power production, primary indication parameters for plant systems, parameters associated with investment protection, parameters which support technical specification monitoring (for a 24 hours period), and PAMI parameters. DIAS-P, which is a fully qualified system, outputs the requisite RG1.97 category 1 parameters.

CRT's provide the MMI for the Data Processing System (DPS), which is independent from the DIAS System (that controls the ELD discrete indicators). The color graphic CRT's are coupled with touch screens for ease in accessing displays, acknowledging alarms and obtaining additional plant information.

The CRT displays include plant, system and component level status and data, but do not include the ability for direct component control. A major benefit of this approach is elimination of the need to analyze and protect against all possible DPS failures which could cause undesirable control actions.

To further support the operator's information needs, CRT display pages are logically arranged in a three level hierarchy where information at each level is designed to support specific operator tasks. Level 1 displays provide for overall monitoring of major plant systems; Level 2 displays provide additional information to support control actions; Level 3 displays provide for detailed monitoring of specific components to support diagnostic tasks.

The DPS performs its own signal validation based on raw sensor input and plant equipment status data. It then compares its results to that obtained from the DIAS and control systems. Any significant discrepancies between these independent systems are alarmed to the operator.

Innovative alarm processing methodologies have been incorporated into ACC to reduce the frequency of alarm conditions, minimize the generation of nuisance/spurious alarms and to prioritize alarms so their severity can be clearly distinguished. Alarms are independently processed by the DIAS and DPS. The DPS further cross checks the alarm processing between these two systems for consistency. Signal validation is applied to data prior to alarming to distinguish between control process alarms and single instrument failures. Alarm annunciation caused by spurious input data or instrument failures are assigned lower priorities than process alarms. Where appropriate, time delays are utilized such that if an alarm condition clears prior to the completion of the delay, the alarm is not generated. This avoids nuisance alarms during certain transient situations.

To reduce the number of generated alarm messages, dynamic alarm processing is employed. Information on the current plant operational mode (e.g. at power, post reactor trip, heatup/cooldown, etc.) and correlations with equipment states are utilized to eliminate unnecessary alarms.

Alarm prioritization is provided so that the operator can determine which alarms require his immediate attention. Three alarm priority classes exist: Alarm Priority-1 requires immediate action by operator to avoid/correct a critical function or technical specification violation or to prevent equipment damage. Alarm Priority-2 requires prompt operator action but can be deferred in the presence of priority 1 alarms at the operator's discretion. Alarm Priority-3 provides cautionary messages.

All non-alarm information, such as status information, is removed from the alarm annunciation process. A separate "operator aid" message is provided for these outputs so that these messages are clearly distinguishable from true alarm conditions. The priority 1 and 2 alarms are available on spatially dedicated alarm tiles on each control panel. The alarm tiles are implemented via solid state electroluminescent displays which are driven by microprocessors. Use of touch screens allows alarm acknowledgement and access to the current alarm list. The microprocessor nature of this system readily supports modifications during the life of the plant. The CRT display system provides all three priority alarm levels as well as the "operator aid" message.

Alarm display features have consistent characteristics regardless of the output media (IPSO mimic, discrete DIAS alarm tiles, CRT display pages). To simplify the operator workload, a single point alarm acknowledgement methodology is implemented between DIAS and DPS. That is, alarms acknowledged on a DIAS ELD alarm tile are simultaneously acknowledged on DPS CRT pages and vice versa.

The ACC Plant Protection System (PPS) prevents exceeding core fuel design limits and the reactor coolant system pressure boundary for anticipated operational occurrences. This function is provided through an interface to the Reactor Trip Switchgear System. Also, the PPS provides assistance in mitigating the consequences of accidents through actuation of Engineered Safety Feature (ESF) systems via the ESF-CCS. The PPS consists of measurement channel sensors, bistable trips, local coincidence logic, and reactor trip initiation logic. Automatic testing and use of four independent channels assures high availability for the protection system.

Non-safety process control is implemented within the Power Control System (PCS) and the Process Component Control System (P-CCS). The PCS integrates an established group of functions which control reactor power level. These functions include Reactor Regulating which provides manual and automatic control of the Control Element Assemblies in the reactor core; Reactor Power Cutback which initiates a partial rod insertion for certain events thus preventing a full plant trip; Megawatt Demand Setter which regulates automatic or manual demands for plant load changes; and CEA Drive Mechanism Control which provides logic and sequencing for Control Element Assemblies which effect reactor control and core power distribution.

The Process Component Control System (P-CCS) is a microprocessor-based interposing logic and control system which controls plant systems and components such as control valves, circuit breakers, motor starters and solenoids. Control sources are logically combined within the P-CCS to effect the final state of the controlled components.

Both the ESF and P-CCS are designed to use validated signals where multiple sensors are available. This significantly improves fault tolerance and plant availability.

The operator performs control actions via dedicated process controllers, component control switches or system operator modules. The process controllers (which replace conventional PID stations) are implemented with programmable electroluminescent microcomputer driven devices that allow easy tailoring of MMI controls and data displays for specific process control loops. Each controller is capable of being configured to control multiple control loops, a master with sub-loop slaves or functionally related but independent loops. Each of these arrangements serve to reduce the amount of required control panel space. Touch access is provided on each ELD flat panel to allow quick and easy mode selection, sensor input signal selection, setpoint changes and manual control for each control loop.

Discrete control switches are also provided for component control. Shape coded pushbuttons with backlighted intelligent status indicators are utilized to provide the operator with important component inoperable and position discrepancy status information for pumps, valves, breakers, fans, etc.

Operators' modules for the major I&C systems such as the Plant Protection System, ESF-Component Control System and Power Control System provide capabilities for system mode changes, bypass, automatic test surveillance and display of status information. The P-CCS and ESF-CCS operators modules also provide an alternate method of plant component control should the normal control panel switches and supporting electronics require maintenance.

Further, to achieve the desired high levels of availability and reliability the design methodologies of Redundancy, Diversity and Segmentation have been incorporated. Redundancy greatly enhances reliability and availability by providing either multiple I&C channels or a backup system component which can immediately assume the operations and functions of a failed primary system component. Redundancy is utilized within ACC for all major processor components within the safety, control and monitoring systems. Redundant backup components are maintained in a "hot-standby" mode where they can immediately replace a failed unit. Switchover, from the primary to backup component, occurs automatically and in a "bumpless" manner that is transparent to the on-line process.

Design diversity is employed to protect against common-mode failures within the control complex. Where applied to the I&C systems, diversity is carried out through the processor chip and operating system level. This assures that any unrecognized potential hardware failure or software system error will not effect all I&C systems since complementary systems implemented with diverse technology will not be affected by the fault.

For the ACC design, diversity is incorporated for the areas of reactor trip, fluid systems control, reactivity control and alarm/information presentation. Within each of these areas, diverse technology is utilized to assure that two independent and diverse I&C pathways exist for control/operation of these functions. This assures continued function availability should a common mode failure occur since the failure will be contained in only one of the two diverse I&C pathways. The following summarizes how diversity is employed in ACC system designs.

| ACC DESIGN DIVERSITY | | |
|---|---|---|
| Function | Design Type 1 | Design Type 2 |
| Reactor Trip | Plant Protection System | Alternate trip via Process-CCS |
| Fluid System Control | Emergency Success Paths (e.g. Emergency Feedwater) via ESF-CCS | Normal Success Paths (e.g. Main Feedwater via Process-CCS |
| Reactivity Control | Emergency Boration via ESF-CCS | Normal CEA Control- via Power Control System |
| Alarm and Indication | Alarm Tiles and Discrete Indicators-via DIAS | CRT Displays-via DPS |
| Emergency Site Power | Diesel | Gas Turbine |

For example, per 10CFR50.62, diversity is required between the reactor trip system and actuation of the emergency feedwater system. ACC meets this requirement by actuating reactor trip from the PPS and actuating the EFW system from both the PPS and Process-CCS (i.e., Alternate Feedwater Actuation Signal).

Segmentation is employed to minimize the impact of a component failure on system operation. Segmentation removes multiple control/monitoring functions from a single large processor and distributes them over many smaller processors, thus limiting the impact of a processor failure. Segmentation has only recently become economically feasible with the advent of readily available low-cost microprocessors. Segmentation is employed with ACC for the ESF-Component Control System, the Process-Component Control System, the Discrete Indication and Alarm System, and the Data Processing System.

Although the foregoing features and advantages of the ACC represent significant advances relative to current generation control complexes, the continued use of spatially separated consoles and functionally distinct panels requires large control rooms and multiple operators. Many forecasters in the nuclear power industry anticipate that the future development of nuclear steam supply systems will shift dramatically away from the mere evolution of current pressurized water and boiling water designs, to designs that are fundamentally different in a number of respects. This includes new plant designs which feature multiple modular reactor units situated at a single site which are all controlled from a single common control room; revolutionary passive plant designs which eliminate the need for immediate operator intervention during upset transients or unplanned events and which assure plant safety regardless of operator action; simplified modular plant designs which have correspondingly reduced monitoring and control requirements (such as gas cooled modular reactor designs which feature a single secondary loop with only one steam generator and one helium circulator); and operational philosophies that promote reduced staffing (such as incorporation of various degrees of automatic control).

SUMMARY OF THE INVENTION

It is, accordingly, an object of the present invention to improve upon the man-machine interface that has been described above with respect to the ACC, in a way that can easily be implemented for the monitoring and control of next generation nuclear steam supply systems and which can easily be adapted for the monitoring and control of current generation nuclear steam supply systems.

This is achieved by providing an ACC Compact Workstation (CW) which represents an improvement in the ACC design to accommodate a compact workstation environment for the operator while meeting all current design criteria. Through this localized compact workstation, the operator is offered all the monitoring, alarming and control functions which have been previously dispersed over many control panels located throughout the control room.

The information display hierarchy in the CW is composed of an IPSO overview display, video display units (VDU's) preferably based on CRT technology and qualified video display units (QVDU's) preferably based on solid state flat panel display technology.

The IPSO big board display presents concise plant status overview information. In addition, certain key plant parameters which were contained on the spatially dedicated discrete indicators in the ACC are now relocated to the IPSO panel. These are parameters most representative of critical function status for safety and power production, and of primary and secondary success path performance. In addition, Priority 1 alarms and Priority 2 alarms related to primary and secondary success paths are also provided on IPSO instead of on a console panel. By relocating this discrete information to the IPSO board, spatial dedication is still maintained while allowing the consoles to be greatly reduced in size and thus support a compact workstation environment for the operator.

The VDU devices are touch access colorgraphic CRT's which contain the same structured type display hierarchy noted previously for ACC, e.g., all component status and sensed parameters in the plant are available for monitoring. The QVDU devices are qualified flat panel devices with touch access that also allow operator access to structured plant data. Their qualified nature assures availability for all plant design basis events. The QVDU displays encompass a subset of the information available at the VDU, i.e., all information needed to assess the critical functions and success paths.

Design diversity is maintained between the VDU and QVDU systems (as was the case for the ACC display systems). The nonqualified VDU's are driven by the DPS while the QVDU's are driven by DIAS which utilizes diverse hardware and software technology from that employed by DPS. Both the DPS and DIAS for the Compact Workstation are essentially identical to the DPS and DIAS employed for ACC, except that DIAS for the CW may include component status information from the ESF-CCS.

Associated with each display unit is an individual, independent control module to allow process and component control. These control modules are based on flat panel "soft controller" technology. The control module (CM) associated with a VDU in the CW supports non-safety control functions (in such areas as reactivity control and energy conversion control) and avoids separate controllers for components and process control. The control module associated with the QVDU (QCM) is a qualified system which supports safety system control functions and avoids separate controllers for component and process control.

Diversity is also maintained between the CM and the QCM. The QCM activates substantially only hardware in the ESF-Component Control System (ESF-CCS) and the Plant Protection System (PPS). The CM, which is implemented with diverse technology, actuates the Power Control System (PCS) and the Process Component Control System (Process-CCS). The PPS, ESF-CCS, PCS and Process-CCS are substantially identical with the systems employed for ACC (with the exception of the man-machine interface).

Another novel feature of the ACC Compact Workstation is the implementation of channel and segment select functions for control. The VDU/CM station requires the operator, via a selector matrix, to designate individual control segments for control purposes. Similarly, the QVDU/QCM station requires the operator, via another selector matrix, to designate individual safety channels for control purposes. Selectability of the QCM to multiple channels simplifies compliance with single failure response criteria. This selective segment and control methodology accommodates any active failure by limiting it to a single channel or control segment. Thus, any potential control error will not propagate to other channels or segments, and the control failure will be constrained.

To improve the man-machine interface, the VDU links to the CM, sending it control selections based on operator requests made at the VDU. The CM reacts to this by displaying appropriate control interface selections so that the operator has immediate control access at the CM. The selection made at the VDU can display control options at the CM at either a high level (process control) or low level (component control). This is the only interaction between the VDU and CM. All control operations occur solely through the CM and the associated control network (CN), apart from the DP system, thus maintaining separation between display and control functions. A similar arrangement exists for the QVDU and QCM.

To allow rapid operator response to certain critical plant events, several dedicated pushbuttons are provided at each workstation. These pushbuttons allow initiation of a Turbine Trip (TT) or Alternate AC site power (ACC) via the non-safety control systems, and the initiation of a Reactor Trip (RT), ESF Actuation Signals (ESFAS) or the Diesel Generator via the safety related systems. Use of dedicated pushbuttons makes these functions immediately accessible to the operator without requiring him to "page" to the appropriate control pages on the VDU/QVDU and/or CM/QCM.

BRIEF DESCRIPTION OF THE DRAWINGS

These and other objects and advantages of the invention will be more evident from the following description of the preferred embodiment, wherein reference is made to the accompanying drawings in which:

FIG. 9 shows a selected comparison of the compact workstation control room of the present invention with a known modular control room complex.

DESCRIPTION OF THE PREFERRED EMBODIMENT

Figure 1:
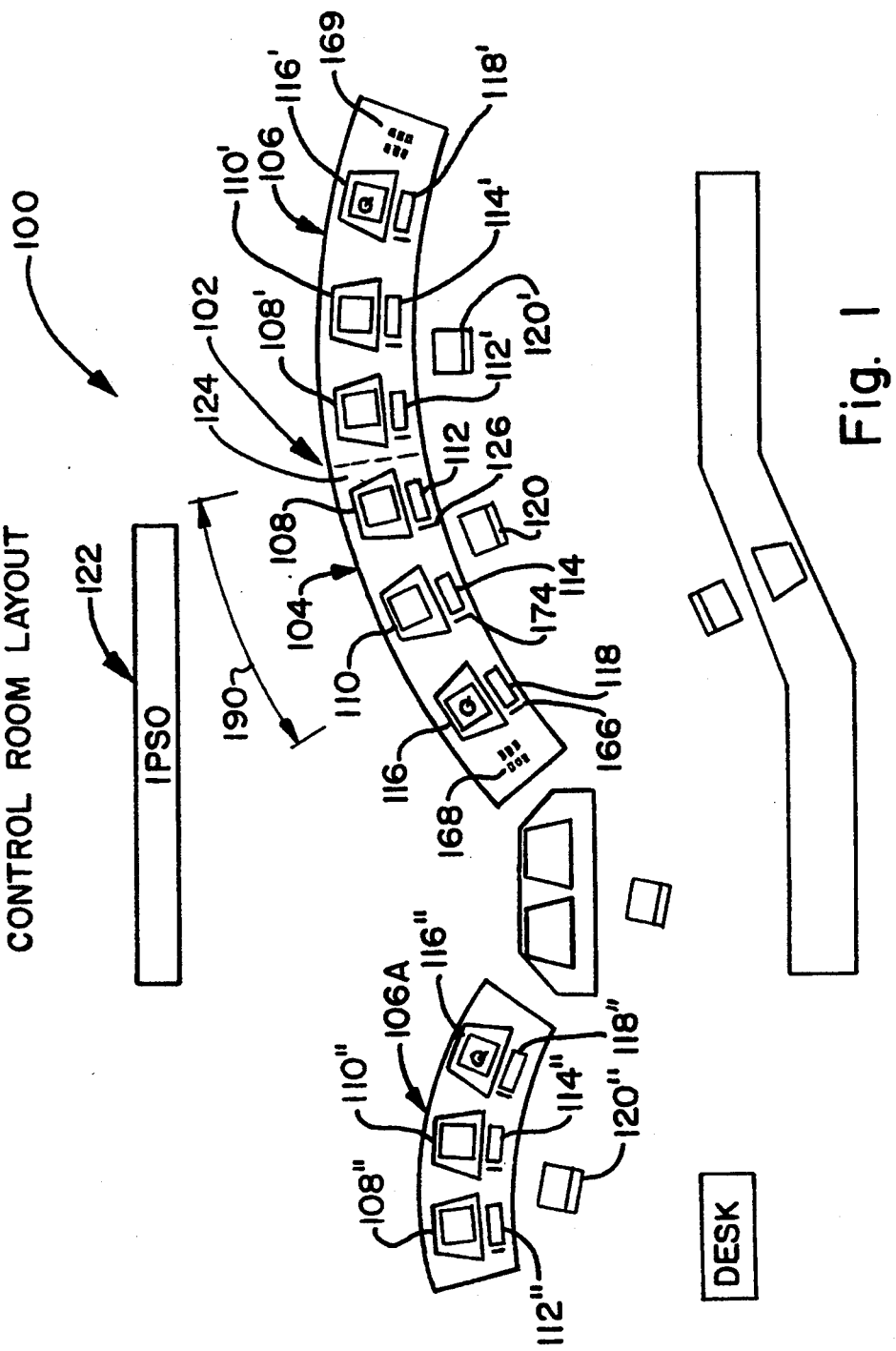
FIG. 1 is a schematic plan view of the control room operator's console incorporating the present invention.

FIG. 1 is a schematic representation of the physical configuration of a compact workstation control room 100 in accordance with the present invention. A master control console 102 is situated substantially centrally in the room and preferably includes a first, or left workstation 104, a second, or right workstation 106, and an auxiliary station 106A. Other seating and work areas can also be provided in a conventional manner.

It should be appreciated that a nuclear power plant has many interrelated systems and subsystems, many of which are themselves parts of other systems or subsystems. In general, however, the plant includes a first plurality of interconnected process equipment defining a nuclear power generation system for generating power under normal operating conditions. The plant includes a second plurality of safety equipment connected to the power generation system that can be activated under off-normal conditions to prevent the occurrence or mitigate the effects of an unsafe condition. In general, the safety equipment referred to in this context, are physically distinct from the process equipment.

The left workstation 104 preferably includes a first video display unit (VDU) 108 and an adjacent, second VDU 110, each of which has a large, substantially vertically oriented display area or screen. Each of the VDU's 108,110, has associated therewith, a respective control module, or CM, 112,114.

In general, the monitoring and control functions associated with the VDU's 108 and 110, and the CM's 112,114, relate to the normal operating conditions of the plant. The third video display module 116 and associated control module 118 relate to safety and/or protective conditions in the plant and, in a manner to be explained more fully below, operate at a higher level of reliability. The safety or "qualified" video display unit (QVDU) 116, and safety or "qualified" control module (QCM) 118 are physically adjacent to and may have the same superficial appearance as the other units and modules in workstation 104.

For purposes of the present invention, monitoring and control action in the plant, can be classified either as "qualified" or "non-qualified". These distinctions arise from the regulatory requirement that a nuclear power plant must be capable of responding to certain accident or transient conditions, without compromising the safety of the area surrounding the plant. For those design basis events which can potentially result in danger, certain pre-established monitoring and control of certain pre-established components and equipment must reliably operate to prevent the occurrence of such event, and/or mitigate the consequences so that the outcome will remain within acceptable limits. Those components and systems which must perform such a safety related function, will hereinafter be designated as "qualified". All other components and systems will, for purposes of the present disclosure, be deemed "non-qualified". As used herein, "safety" is essentially synonymous with "qualified", and "non-safety" is essentially synonymous with "non-qualified" or "process". It should be appreciated that under an accident or transient condition, the operator may prefer to utilize a non-safety system to mitigate or control the transient. The non-qualified systems are not, however, required to be of such high reliability and configured in such a manner, that they must be available for performing a safety function.

The master control console 102 is substantially symmetric both physically and functionally, except for button arrays 168 and 169, which will be described in greater detail below. More particularly, the VDU's, CM's, QVDU's and QCM's indicated by primed numeric identifiers in workstation 106, are physically identical, and are capable of performing the same functions, as their unprimed counterparts in workstation 104.

It should be further appreciated that the left workstation 104 is of a physical size such that an operator sitting in seat 120, can easily view all the display units 108, 110, and 116. Typically, the master console 102 would be in the form of a crescent-shape table or the like 124 into which the control modules 112, 114, and 118 are secured in a substantially horizontal or slightly inclined orientation, and on which the display units 108, 110 and 116 are supported in a substantially vertical orientation. The workstation 104 is thus sufficiently compact that all of the control and monitoring functions for the entire plant (assuming the plant has one nuclear steam supply system) are available to the operator at substantially a single location 120 in the control room. Single location means that all displays can be viewed, and all control action taken, while the operator sits or stands within a few steps of a fixed point on the floor. Each of the workstations 104,106, is situated such that the operator can, with a mere turn of the head, view the integrated process status overview, or IPSO board 122.

The master control console 102 as shown in FIG. 1 can accommodate a second operator, who would be located at seat 120', if this were deemed necessary or appropriate, during, for example, accident conditions. Similarly, if a defect arises in a particular display unit or control module in the left workstation 104, one of the corresponding units or modules in the right station 106 can be used, even by a sole operator.

Figure 2:
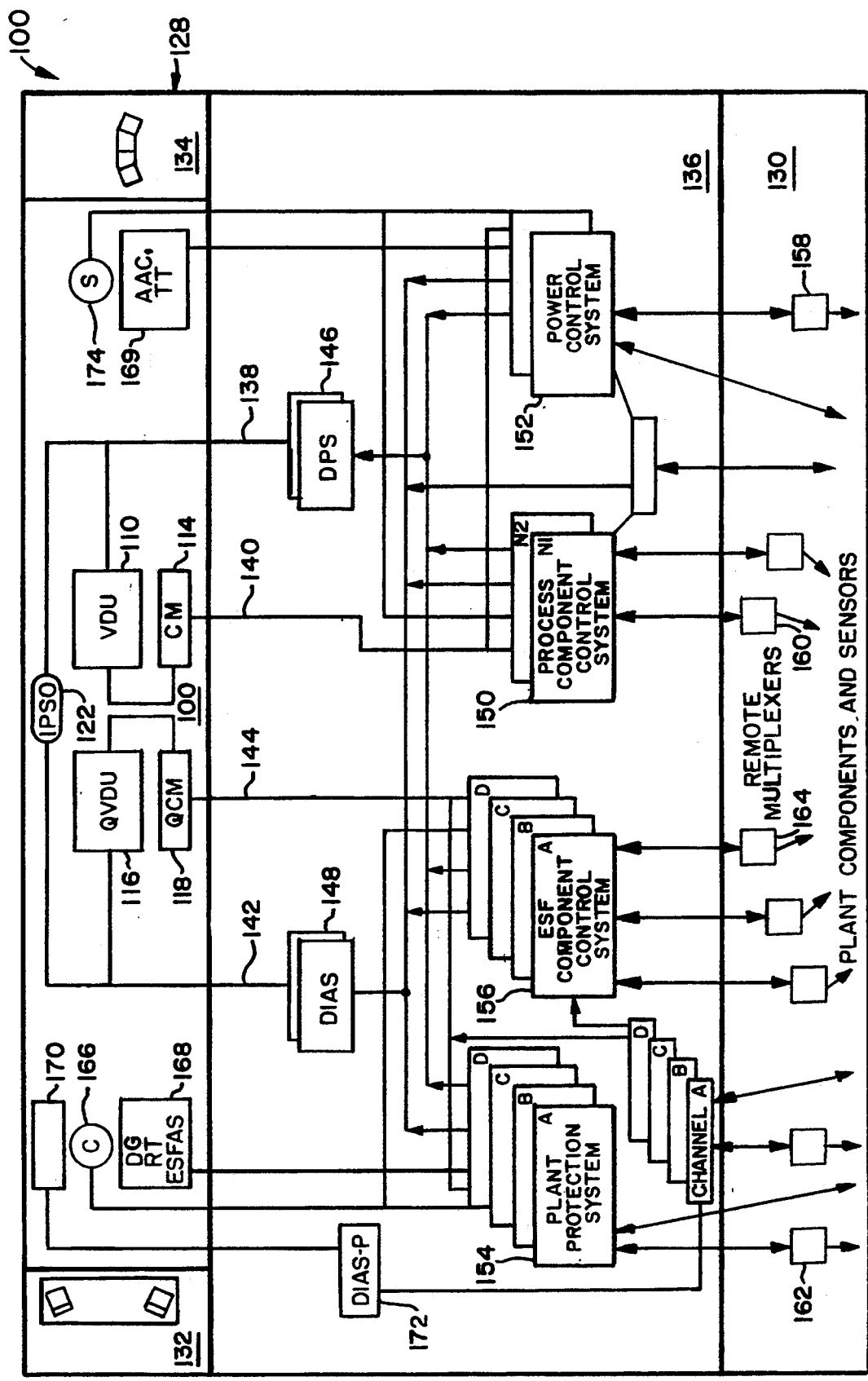
FIGS. 2a-2b are schematic diagrams of the signal flows between the operator console and the various monitoring, protection, and control systems in accordance with the invention.
Figure 3:
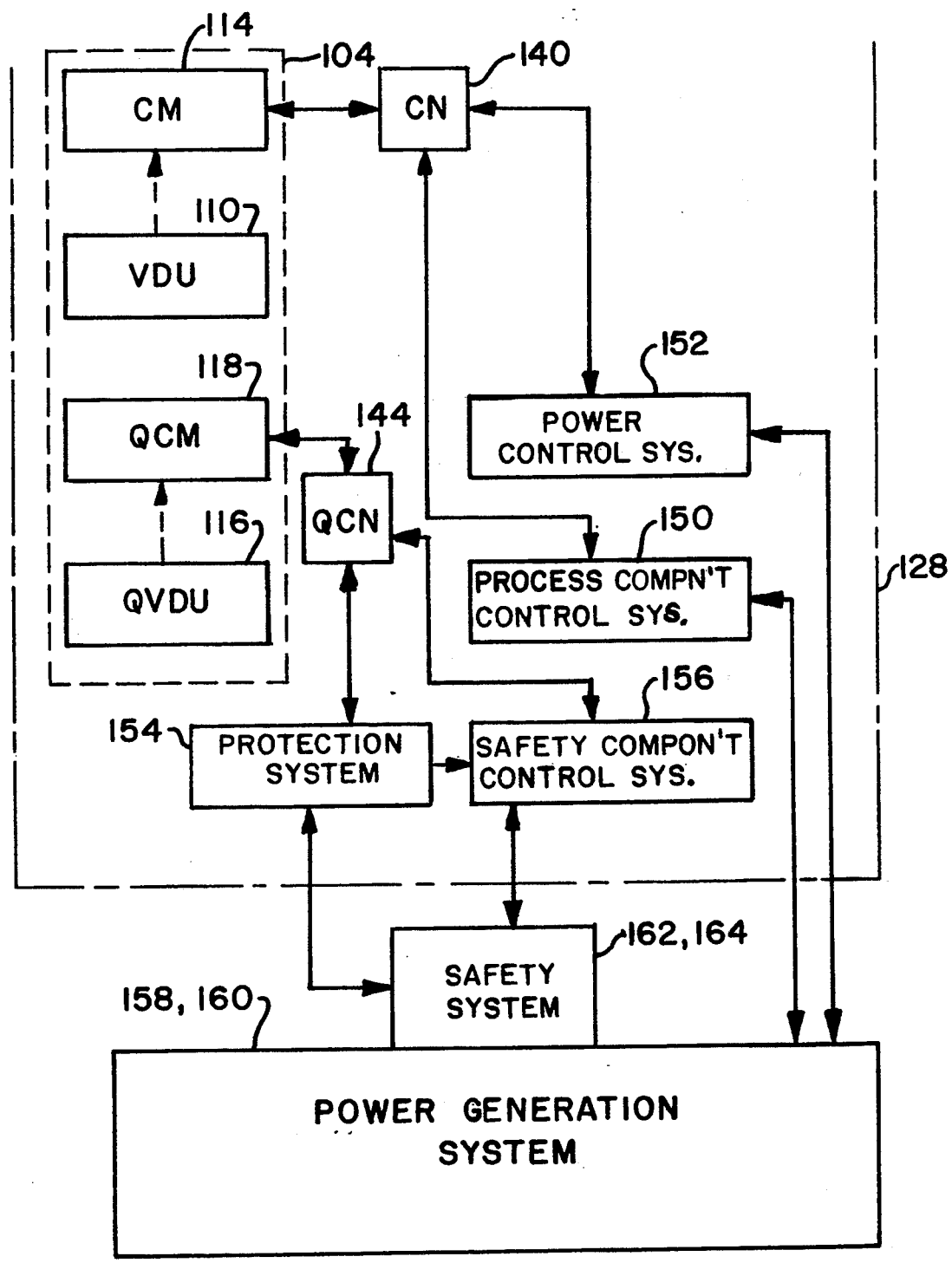
FIG. 3 is a block diagram representing a simplification of FIG. 2, to show the essence of one aspect of the invention.

FIGS. 2 and 3 show the instrumentation and control system 128 embodying the present invention, for interacting with the process and safety equipment via associated sensors and actuators 130, as manifested in the control room 100. The control room preferably also includes a technical support center 132, a remote shutdown room 134, and a computer room 136. The control room 100 is shown as containing one video display unit 110 and an associated control module 114, one qualified video display unit 116 with an associated qualified control module 118, and the IPSO board 122. The video display unit 110, as well as the IPSO 122, are responsive to a display network 138. The control interfaces at the control module 114 are implemented through a control network 140 that is distinct from the DPS-implemented display network 138. Similarly, the qualified video display module 116 and IPSO 122 are responsive to a qualified display network 142, and the control interfaces at the qualified control module 118 are implemented through a qualified control network 144 that is distinct from the DIAS-implemented qualified display network 142.

The schematic representation in FIG. 2 has omitted, for clarity, the display units and control modules other than 110,114,116,118 shown in master console 102 of FIG. 1.

The non-safety monitoring is under the operation of the data processing system 146 which receives input signals from sensors and associated remote multiplexors 160,158, via the process component control system 150 and the power control system 152, respectively. The DPS may also receive certain input via the PPS 154 and ESF-CCS 156. Signals indicative of the monitored parameter are stored within the DPS and made available as needed by the operator at the video display unit 110. A parameter value or component status display on the control module 114 is received via the control network 140, and control signals originated by the operator from control module 114 actuate and/or regulate the process equipment in the process component control system 150 and the power control system 152.

A similar overall architecture is evident in the central role of the DIAS computers 148 for display of safety related parameters. Safety related status or parameter values are obtained from the sensors associated with the safety equipment via 162,164, the protection system 154 and ESF component control system 156. DIAS may also receive selected input via the PCCS and PCS. To the extent safety equipment can be controlled by the operator, it is through the qualified control network 144 interacting with the plant protection system 154 and safety components control system 156. As is conventional, the PPS 154 is designed for self-actuation, but may be subsequently controlled by the operators. The safety grade plant protection system 154 and safety component control system 156, operate on the basis of four channels and an associated enable/actuation logic.

The non-safety grade control module 114 is implemented by a one computer system 140 that is independent of, and of a different operational character than, the computer system 142 for implementing the qualified, safety grade control module 118. The VDU's such as 110, are touch access colorgraphic CRT's, whereas the QVDU's such as 116, are qualified flat panel devices with touch access. The non-qualified VDU's are driven by the DPS 146, while the QVDU's are driven by DIAS 148, which utilizes diverse hardware and software technology.

It can be appreciated that FIG. 2 supports a separation of non-safety control and safety-protection systems to avoid common control/protection failures that would degrade the plant's defense-in-depth. This is accomplished by separate control modules 114 for normal operation, and for safety and protection 118, while integrating these functions into a common operator workstation 104 as shown in FIG. 1. This arrangement also supports a defense-in-depth to protect unidentified common mode failures (e.g., software errors) that could lead to unsafe conditions, such as a transient without scram. Function, hardware and software diversity between the normal control and safety protection systems are evident in the respective networks including man-machine interfaces at the workstations.

Associated with the display devices 110,116, are independent control modules 114,118 based on flat panel, "soft control" technology. The VDU 110 links to the CM 114 and sends it display page selections based on operator requests made at the VDU 110. The CM 114 reacts to this by displaying appropriate control interface selections so that the operator has immediate control access at the CM 114. This is the only interaction between the VDU and CM. All control operations (i.e., actuation and response feedback) occur solely through the CM, thereby maintaining separation between display and control functions. A similar arrangement exists for the QVDU 116 and QCM 118.

FIG. 3 emphasizes that the control action and response actuation signals are processed between the control module and a particular controlled component (and between a qualified control module and a qualified component), through the control (and qualified control) networks, independently of the VDU and QVDU which, as shown in FIG. 2, depend on signal processing from the DPS and DIAS, respectively.

Thus, the control and protection systems maintain simple, highly reliable deterministic performance without the burden of wide, complex monitoring applications. Moreover, this separation also avoids imposing control-related response requirements on the monitoring system. The monitoring function typically requires response times in the range of 2.0 to 3.0 seconds, whereas control response times are typically about 0.1 to 0.5 seconds. Since the compact workstation arrangement shown in FIG. 2 provides a man-machine interface for control actuation feedback directly on the control module (e.g. 114,118), the 0.1 to 0.5 second performance demand can be restricted to the control and protection system, without burdening the large and complex applications in the monitoring system. For example, signal validation is not performed in the control networks for controlled equipment response, whereas validation is made for process response in the display networks. In addition, the system described herein ensures a coordinated control and monitoring interface despite the separation. This is achieved by the display selection transition between the control modules 114,118 and respective display units 110,116.

Figure 4A:
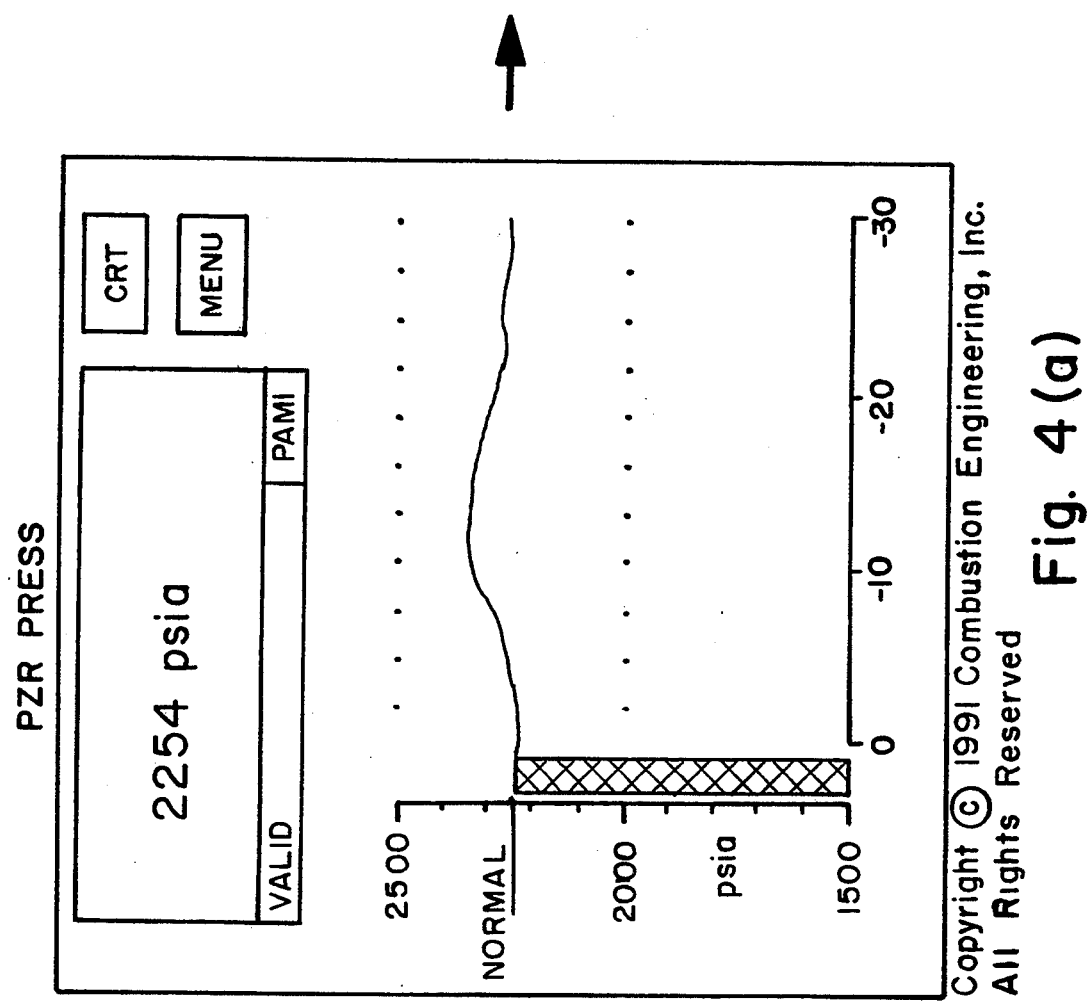
FIGS. 4(a), (b) and (c) are paginated screen displays typical of a video display unit of the present invention.
Figure 4B:
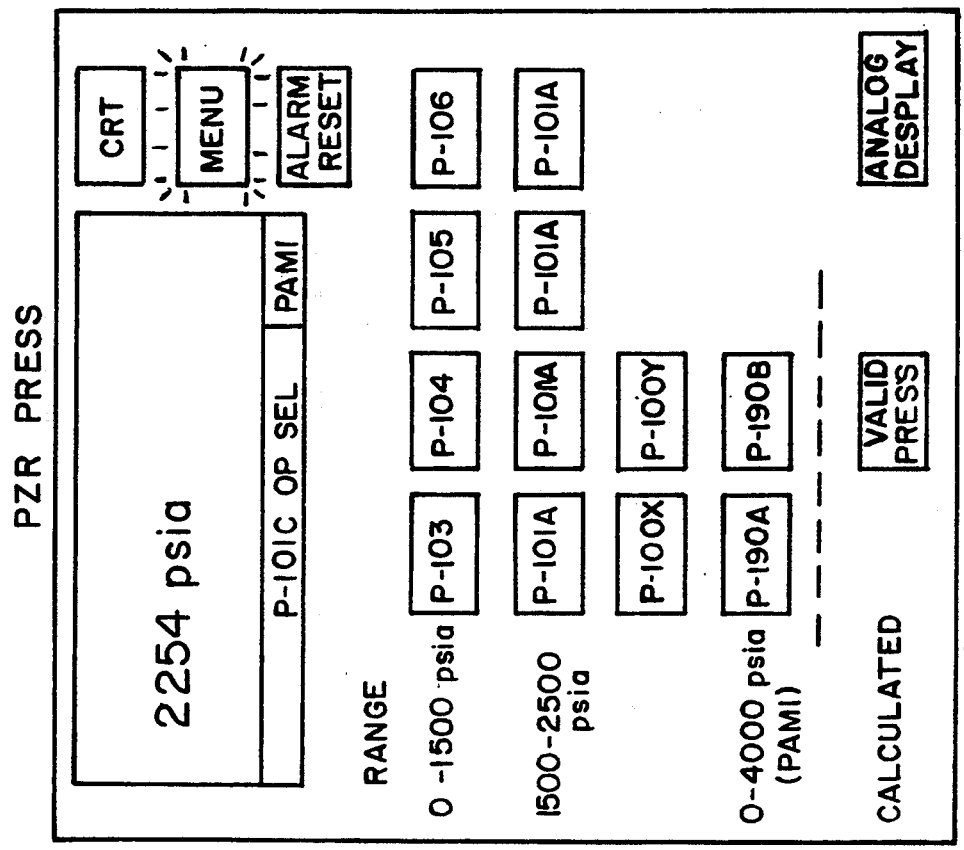
Figure 4:
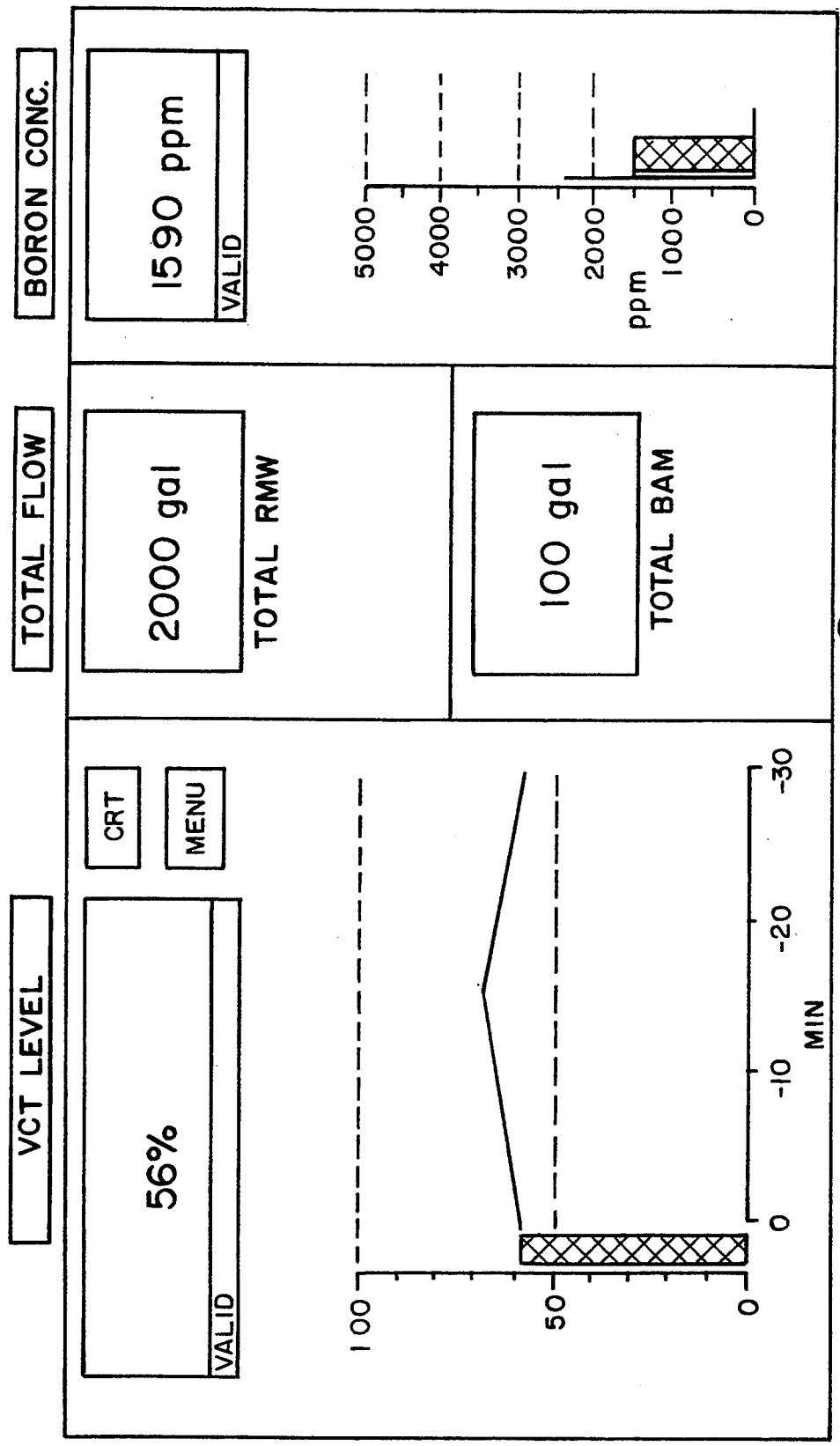
Figure 5A:
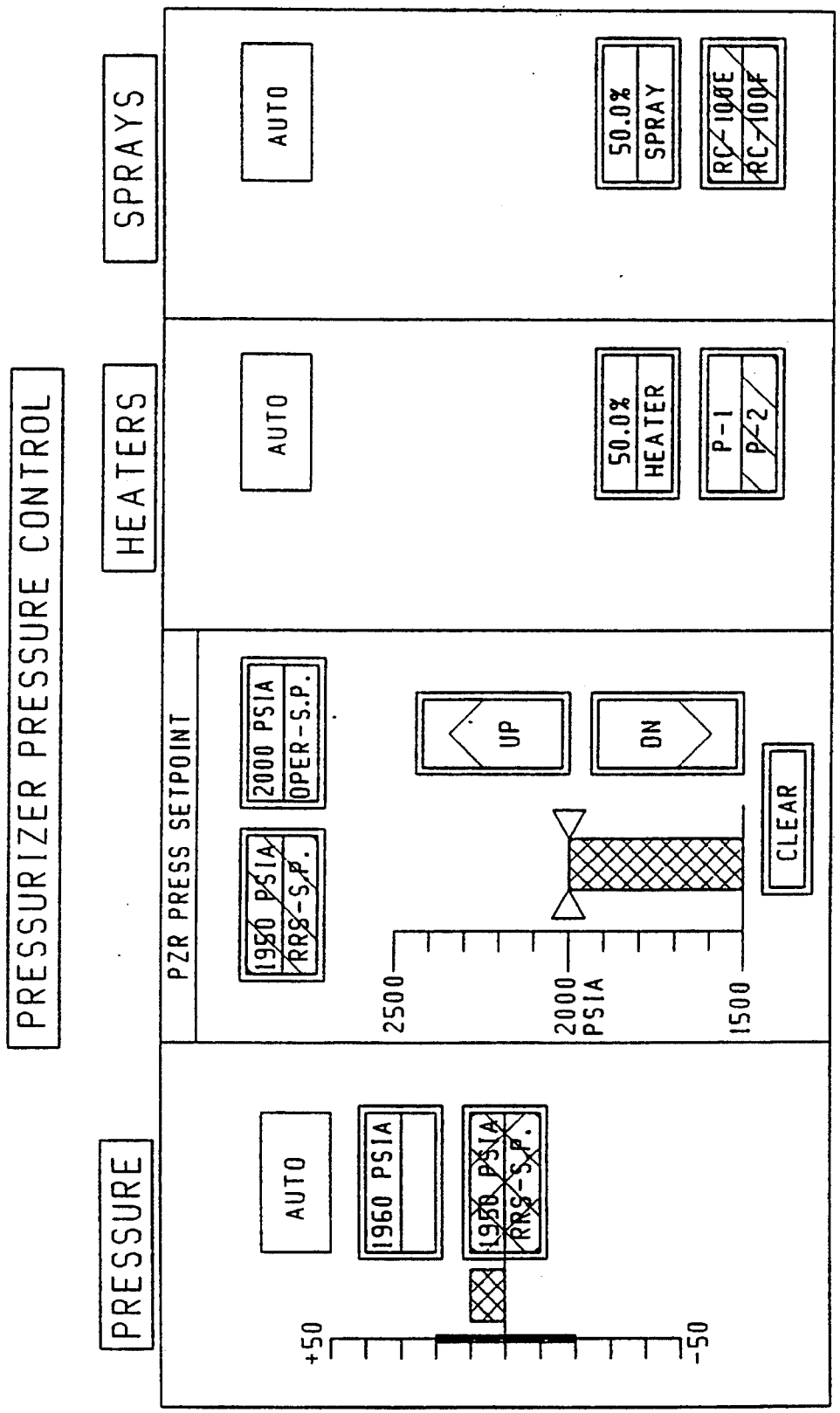
FIGS. 5(a), (b) and (c) are screen displays typical of a control module of the present invention.
Figure 5B:
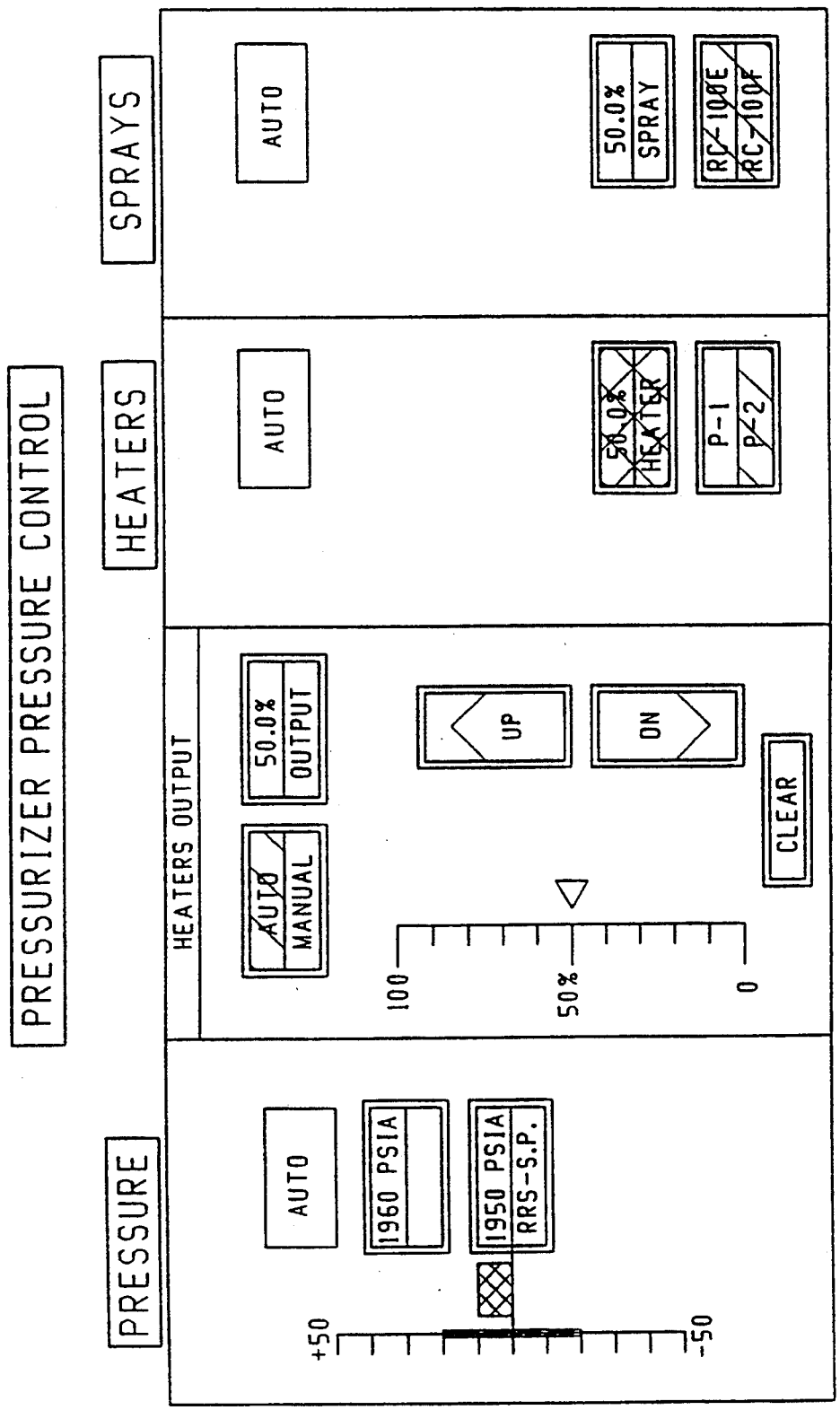
Figure 5C:
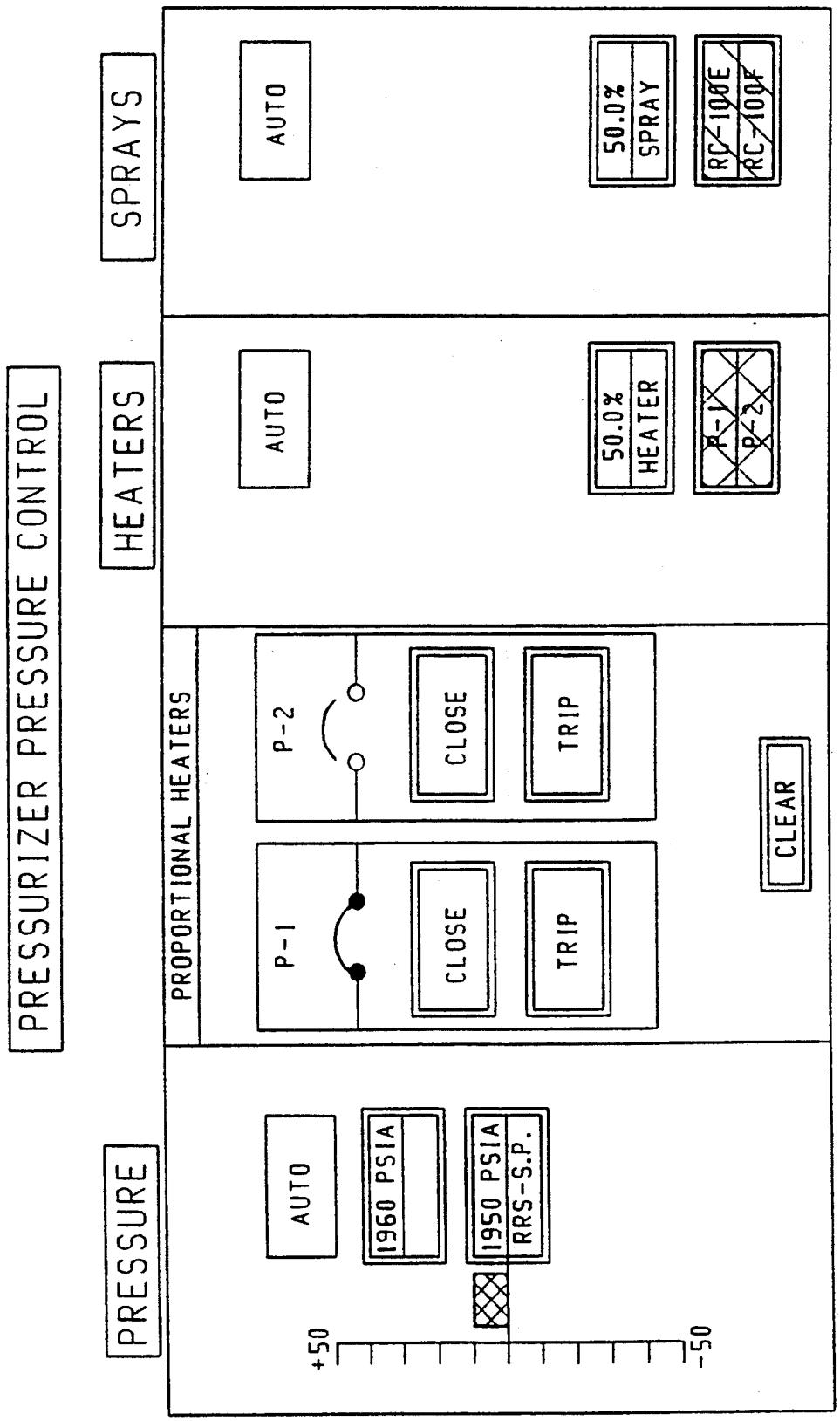

FIGS. 4(*a*), (*b*) and (*c*) are typical of the kinds of images available on a paginated basis, to the operator at the QVDU. Similar monitoring images are available at the VDU, but for a wider variety of parameters. In this particular example, the link between the QVDU and the QCM permits the operator, while viewing pressurizer pressure at the QVDU, to also view and select on the QCM, the type of control that is desired for affecting pressurizer pressure. For example, the operator may make a selection which results in the availability of the sequence of control interface screens shown in FIGS. 5(*a*)–(*c*). The touch sensitive display screen shown in FIG. 5(*a*) permits the operator to increase or decrease the pressurizer pressure set point, or, by pushing one of the "heater" buttons, to access the image shown in FIG. 5(b). This permits the operator to increase or decrease heater output, whereas by paging to the screen shown in FIG. 5(c), the operator may control a particular component, i.e., an individual proportional heater.

It should be appreciated that the present invention can be implemented using the DPS 146 and DIAS 148 substantially as described in said International application. Similarly, the process component control system, power control system 152, plant protection system 154, and safety component control system 156 (with the exception of the man-machine interface) are substantially identical to those described in the International application. Finally, the information hierarchy available at IPSO 122 and the display units 110, 116 is similar to that described with respect to IPSO, the CRT's and the discrete indicators, in said International Application.

The preferred embodiment of the invention includes a number of other features which take advantage of the separation of the control from the monitoring functions associated with the system architecture shown in FIG. 2. For example, a channel selector 166 for the safety systems, enables the operator at the workstation to select any one of the four plant protection system channels as the channel upon which safety control action will be taken by the system. Thus, a failure in the QCM will only affect one safety channel. The other safety channels remain uncompromised with control available at the other workstation, or outside the main control room.

In yet another preferred feature, the control functions on the non-safety side, are segmented to avoid adverse inter-control system interaction that would be unmanageable for plant operators and/or unbounded by the plant's safety analysis. This is accomplished in control module 114, whereby the operator, via a selector matrix 174 can designate individual control segments for control purposes. This is analogous to the selector 166 by which the QVDU 116 and QCM 118 can be configured to designate individual safety channels for control purposes. The degree of segmentation is based on credit taken for independence of control system failure in the safety analysis.

Figure 6:
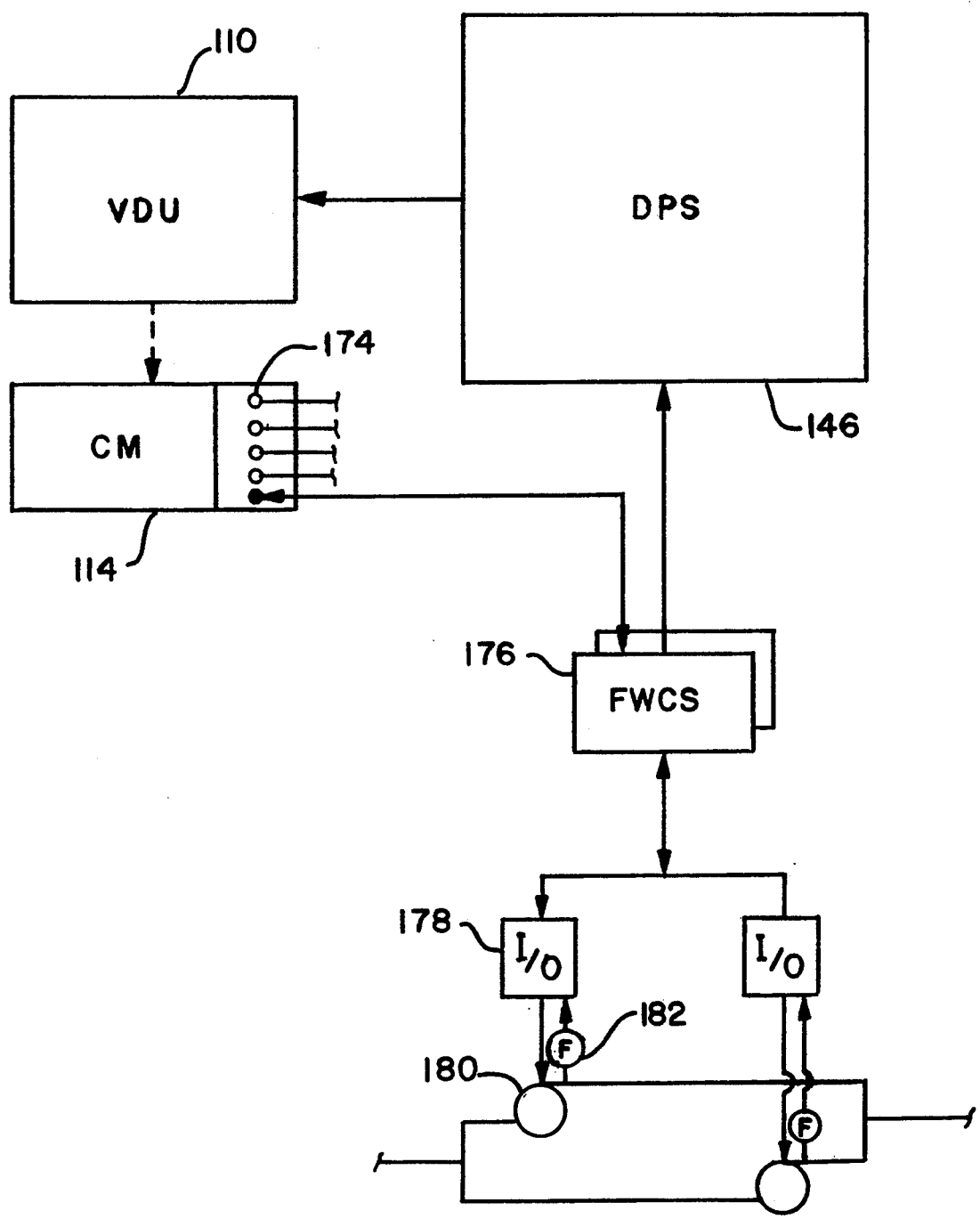
FIG. 6 is a schematic representation of the segment selection feature of the process component control aspect of the present invention.

The segmentation feature of the control module in accordance with the preferred embodiment, is shown in greater detail in FIGS. 6 and 7. The selector matrix associated with the control module, in essence enables control action for a particular segment. In FIG. 6, the feedwater control system segment is enabled such that control action and actuation response follow a processing path from the control module 114, the enabling selector matrix 174, the computer processor associated with the feedwater control system 176, the input output interface 178 associated with, for example, the pumps 180 and associated flow sensors 182. The monitoring of the processes and components in the feedwater control system, is performed through the signals that pass from the feedwater control system to processing in the DPS and ultimate display in the VDU, independently of the signal processing associated with the control action.

Figure 7A:
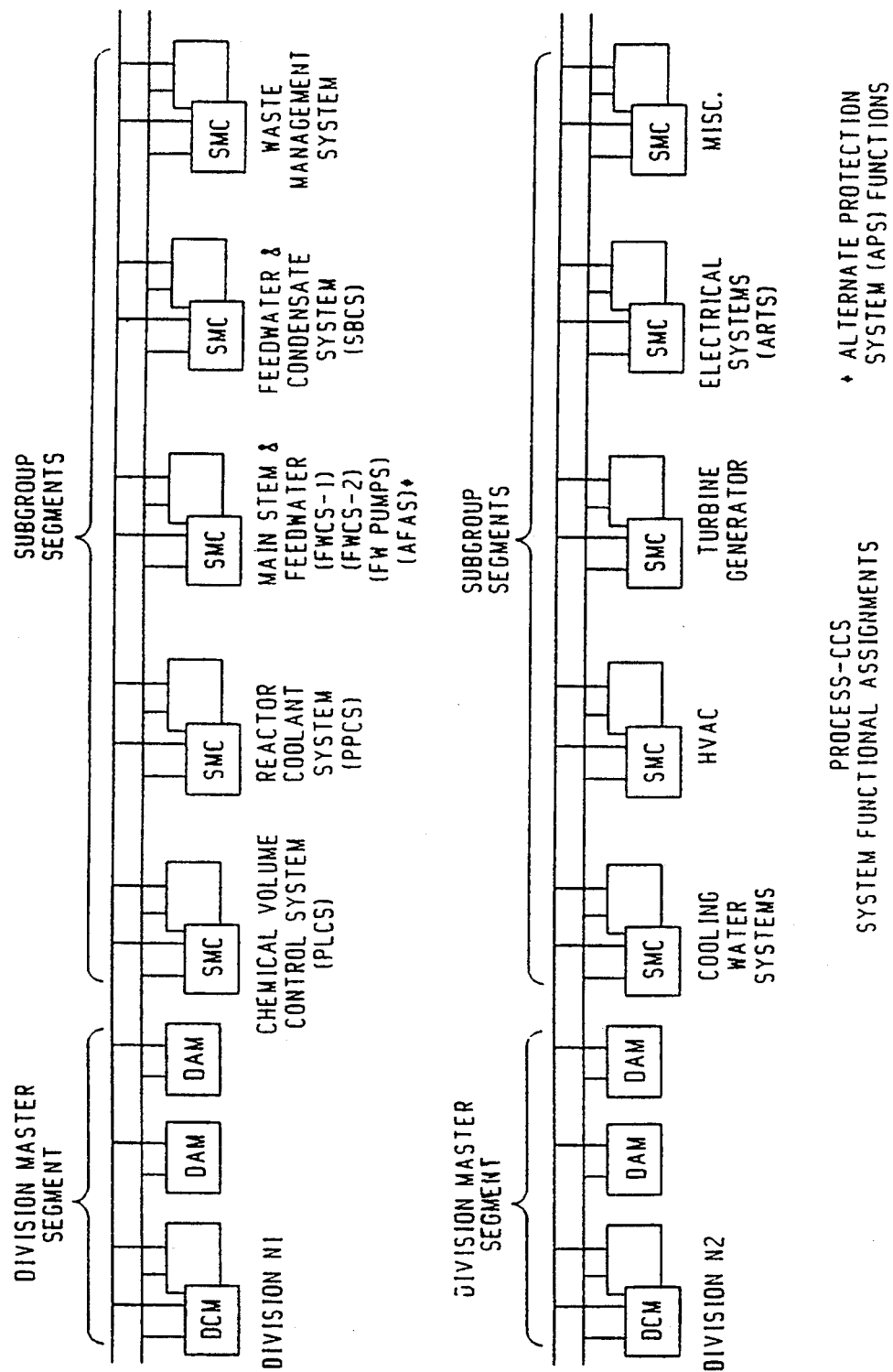
FIGS. 7(a) and (b) are schematic representations of segmentation in the process component control system.
Figure 7B:
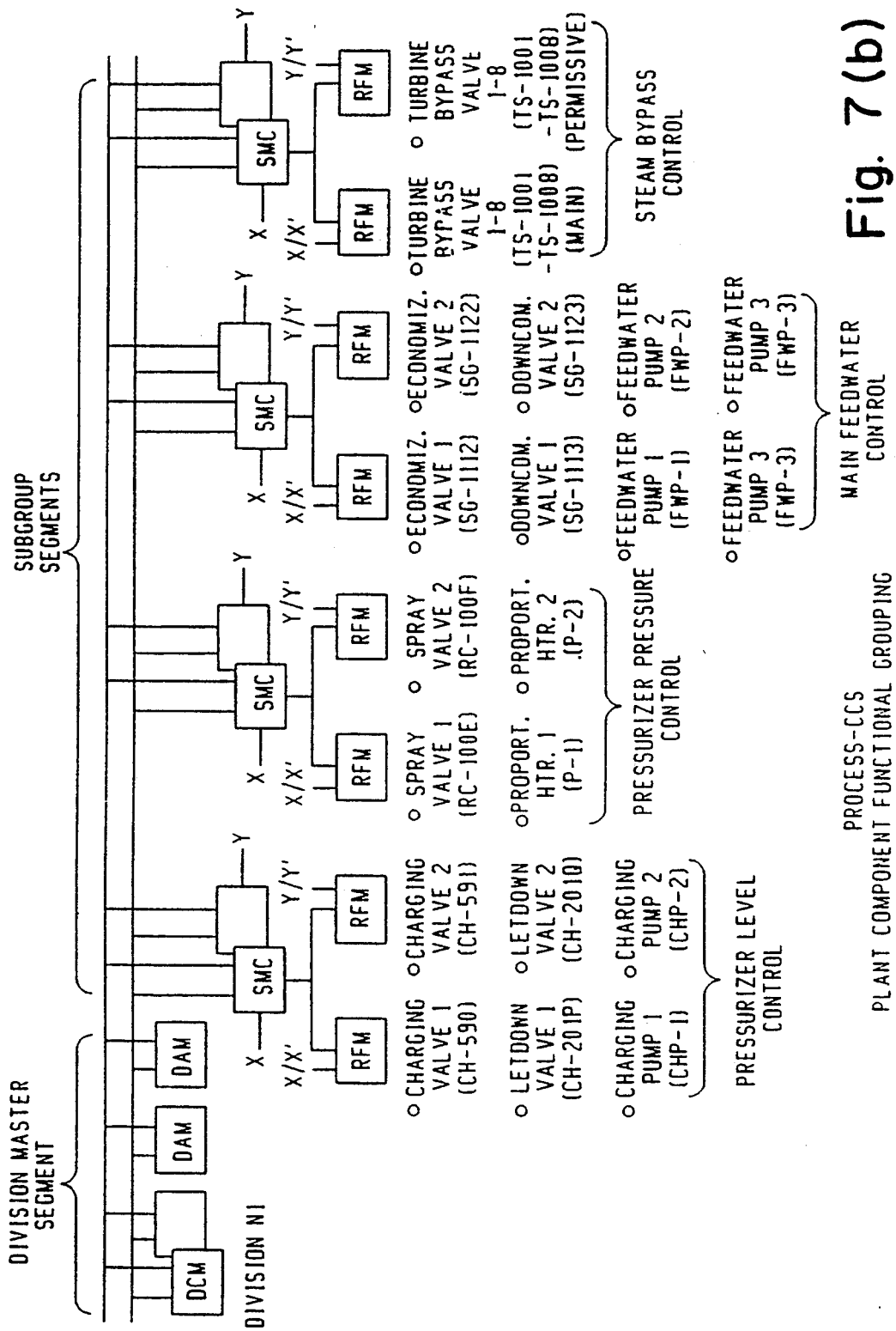

FIGS. 7(a) and (b) illustrate one of a variety of possible segmentations of the various non-safety processes in the plant. It may seen that, for the present example, the main steam and feedwater segment shown in the upper portion of FIG. 7(a) includes 8 components as shown in FIG. 7(b). The concept of segmentation is more fully set forth in the "Utility Requirements Document", Chapter 10, Man Machine Interface Systems, available from the Electric Power Research Institute.

Figure 8:
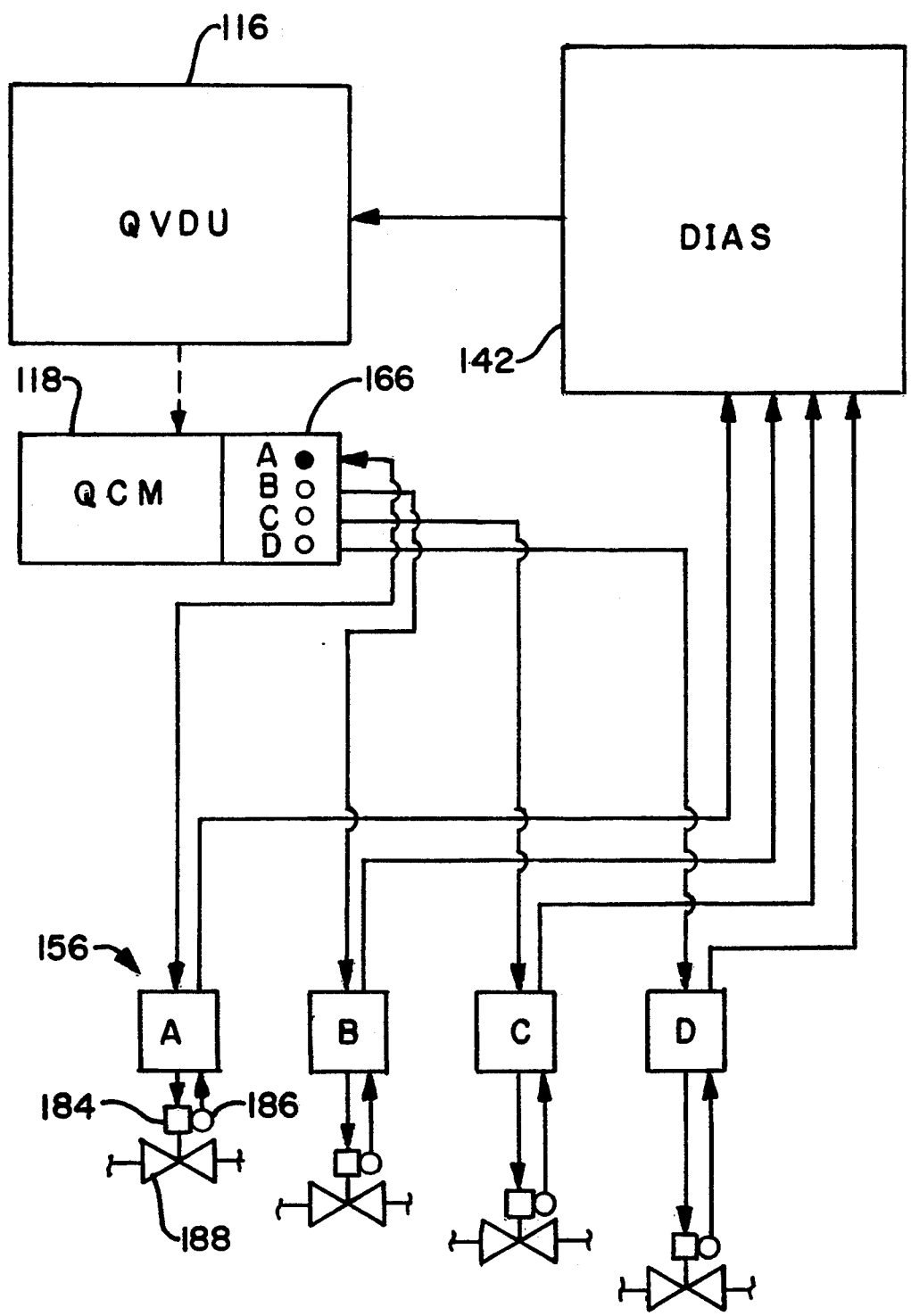
FIG. 8 is a schematic representation of the channel selection feature of the safety component control aspect of the present invention.

FIG. 8 illustrates the channel selection aspect 166 of the present invention, associated with the qualified control module 118. In order to effectuate control action on a qualified component, the operator must select a particular channel, such as "A", which thereby enables control and actuation response signal processing from the QCM, through the A channel of the plant protection or engineered safety feature system 156, to the valve actuator 184, and a similar processing of data in the opposite direction, from a sensor 186 associated with the actuated component 188, whereby the response is manifested on the QCM. The operator can monitor the relevant parameter through the processing of the DIAS 142 as manifested on the QVDU 116, but the monitoring processing is independent of the control related processing.

By requiring the selection of a particular channel at 166 for control action, a failure in channel A will not propagate to the other channels, and the operator can easily select another channel to achieve the required control action.

The features of the compact workstation control room as described above, when fully integrated, significantly improve the efficiency while reducing the size and equipment in the control room. Although a number of novel functions of the invention have been described, another aspect of the invention is the improved spatial dedication of the indicators and alarms, as well as the above-described control action, relative to the known control rooms such as the ACC.

FIG. 9 is a selected comparison of indicator and alarm interfaces, as between the ACC and the CW. It can be appreciated that many of the indicator and alarm interfaces have been moved to the IPSO board in the CW, thereby reducing the information that the operator must access at the QVDU. On the other hand, should the operator so desire, all the DIAS information can be accessed at the QVDU, although much of it is preferably viewed on the IPSO.

Another desirable feature of the preferred embodiment, is the provision of a distinct, direct acting plant protection and control at 168,169 which is spatially dedicated to actuate a limited number of key functions at the workstation. The operator can easily initiate a turbine trip, or access alternate AC site power via the non-safety control systems via push buttons at 169, and initiate a reactor trip, an engineered safety feature actuation signal, or start the diesel generators via the safety related systems via push buttons at 168.

Another preferred feature is the incorporation of a post accident monitoring system (PAMI) into the workstation. Specially dedicated continuous display requirements for accident monitoring parameters and the availability status of safety systems are displayed at 170, through the DIAS-P computer system 172, which is itself independent of the data processing system 146 and the DIAS-N 148. Display 170 is preferably a dedicated QVDU integrated into the compact workstation.

The arrangement shown in FIG. 1 provides that, on each workstation 104, two normal plant processes can be controlled simultaneously without cumbersome display/control selection, as a result of providing two video display modules 108,110 and two associated control modules 112,114 constituting a monitoring and control area 190. The qualified devices 116,118, which are essential during accidents, are used frequently during normal plant operation to assure familiarization during stressful accident utilization. The qualified video display units and qualified control modules are integrated into the compact workstation along with the normal man-machine interface.

In a minimum operator working condition, one operator can utilize multiple workstations 104,106. To minimize display selection pagination, the two workstations are preferably provided in semicircular, side-by-side, mirror image relationship. A maximum required staffing of two operators at adjacent workstations 104,106 can coordinate closely to partition control of critical plant functions.

As shown in FIG. 1, an auxiliary operator station 106A is preferably provided for maintenance, testing, and surveillance, and is always on line independent of the operations performed at the master console 102. This not only accommodates a failure of either workstation 104, 106, but in the event the main workstations are being utilized in a critical plant event, a third operator can utilize the auxiliary station to restore failed redundancies. This arrangement maximizes operator efficiency by avoiding physical interference with each other, and by assuring that each operator has a respective monitoring and control interface of full scope.

Figure 10:
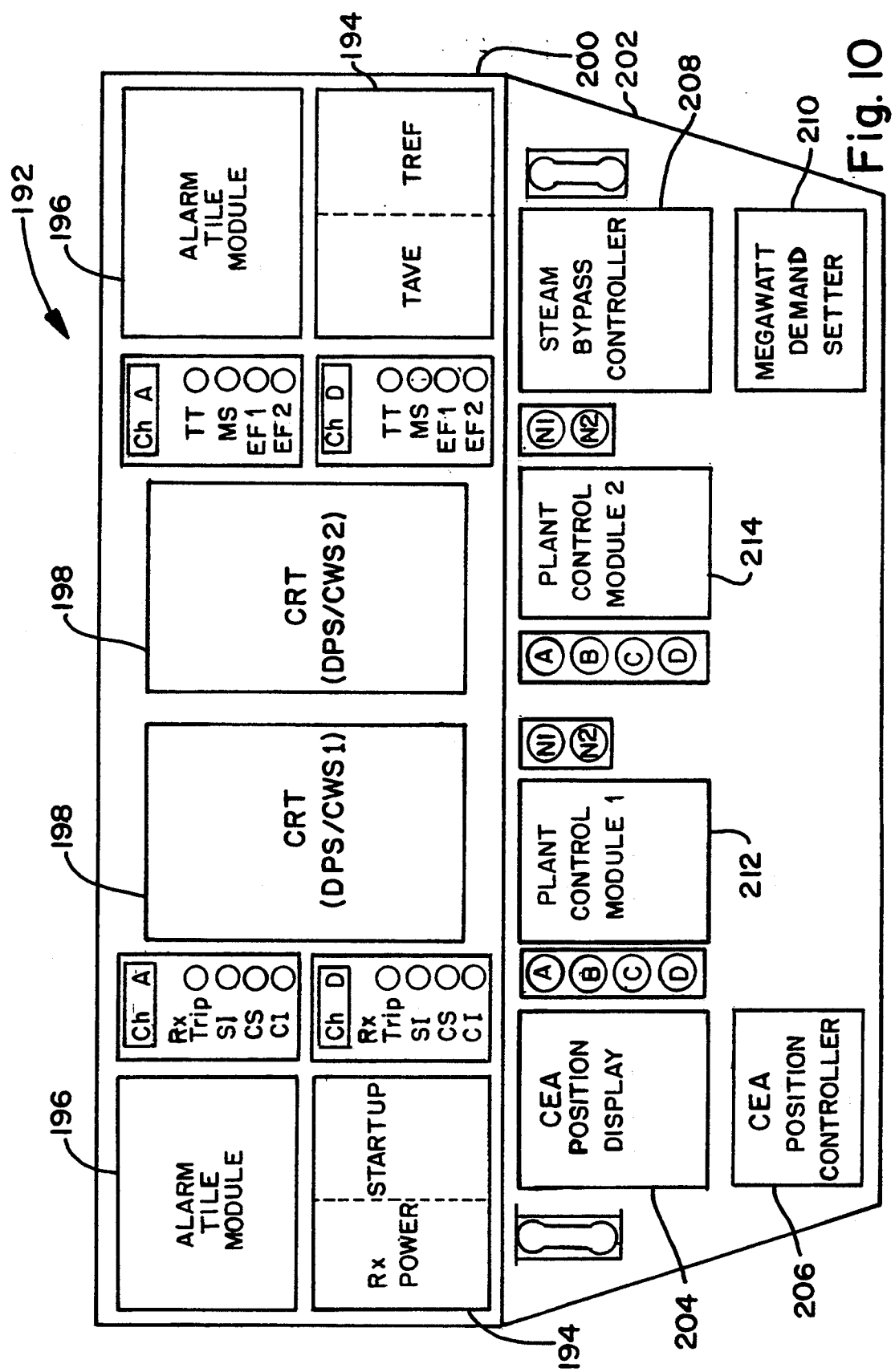
FIG. 10 illustrates how aspects of the compact workstation of the present invention can be incorporated into known modular panels.

As also shown in FIG. 1, in the complete implementation of the present invention, a given workstation has only one screen device associated with the VDU, one screen device associated with the QVDU, one screen device associated with the CM, and one screen device associated with the QCM. On the other hand, as shown in FIG. 10, it is possible to incorporate several of the novel aspects of the present invention, into a conventional control room console or panel 192. In this implementation, aspects of the ACC are combined with features of the CW. For example, certain discreet indicators 194 and alarm tiles 196 are processed through and displayed by the DIAS. The CRTs 198 display data that have been processed by the DPS. As is conventional, all the monitoring interfaces are located on the vertical portion 200 of the panel.

On the desk portion 202 of the panel, the laterally outer control interfaces 204, 206, 208, 210 are of a conventional design and configuration, whereas the two, inner "plant control modules" 212, 214 are similar to those control modules such as 112, 114, described with respect to FIG. 1. In FIG. 10, each control module has an associated array of channel selection buttons A-D, and division master segment selection buttons N1 and N2. Through software, plant control module 1 could be configured for safety control, preferably with the channel selection represented in FIG. 8, whereas plant control module 2 could be used for process control with segmentation such as described with respect to FIG. 6 and 7. Alternatively, the console 192 shown in FIG. 10 could be dedicated, for control purposes, to process control, such that the operator has two plant control modules available for process control. In this configuration, another console or panel (not shown) would have a desk portion which includes a qualified control module. It should be appreciated that in the embodiment of FIG. 10, the equivalent of "qualified" monitoring output is provided by the alarm tiles 196 and the discreet indicators 194 at the flanks of the vertical portion 200 of the panel, by virtue of processing through DIAS.

The separation and independence of the control operations from the monitoring operations, as represented in FIG. 3, can also be implemented in the configuration shown in FIG. 10, through appropriate software links between the DIAS-driven discreet indicators 194 and the qualified control module e.g., 214, and between the non-qualified CRT display 198 and the non-qualified plant control module e.g., 212. In other words, the operator can quickly obtain a control display screen at the control module, by an appropriate touch selection on a monitoring display. Once the control display appears on the control module, control action and actuation response are processed through the control networks 140, 144 as shown in FIG. 3.

We claim:

1. A compact workstation control room for monitoring, alarming, and controlling the operation of safety qualified and non-qualified components in a nuclear power plant, comprising:

a plurality of physically adjacent operator work stations each having at least;

two video display units (VDU) driven by a first digital computer network and having a touch access colorgraphic screen through which a structured, paginated first monitoring display heirarchy of the qualified and nonqualified components can be accessed by the operator;

a safety qualified video display unit (QVDU) driven by a second digital computer network and having a touch access flat panel display screen through which a structured, paginated second monitoring display heirarchy of qualified components can be accessed by the operator;

two control modules, (CM) located adjacent a respective VDU and driven by a third digital computer network, and having a touch access flat panel display screen through which a structured, paginated first control heirarchy can be accessed by the operator for controlling the non-qualified components of the plant;

a qualified control module (QCM), driven by a fourth digital computer network, and having a touch access flat panel display screen through which a structured, paginated second control heirarchy can be accessed by the operator for controlling the qualified components of the plant;

wherein the control module (CM) and qualified control module (QCM) screens permit the operator to control particular components in the plant upon touching control images on said screens;

means for linking the VDU to the CM such that the VDU displays control options to the operator and, in response to the option selected by the operator at the VDU, the VDU sends a control display page request signal to the CM, whereupon the CM displays a particular one of a plurality of available touch sensitive non-qualified component control images to the operator;

means for linking the QVDU to the QCM such that the QVDU displays control options to the operator and, in response to the option selected by the operator at the QVDU, the QVDU sends a control display page request signal to the QCM, whereupon the QCM displays a particular one of a plurality of available touch sensitive qualified component control images to the operator.

2. The compact workstation control room of claim 1, further including push button means dedicated at each workstation so as to always be available for use without pagination on the VDU or QVDU, for operator component actuation response to selected critical plant events including turbine trip, alternate AC site power, and reactor trip.

3. The compact workstation control room of claim 1, further including a QCM safety channel selection matrix for the operator to select one safety channel from among a plurality of available safety channels, whereby only the qualified component in the selected channel can be controlled by the CM.

4. The compact workstation control room of claim 1, wherein the monitoring displays available on each QVDU screen encompass a subset of the monitoring displays available on each VDU screen, said subset including all information needed to assess the safety related critical functions and success paths for the plant.

5. The compact workstation control room of claim 1, wherein the selections made at the VDU and QVDU, can display control options at the CM and QCM, respectively, alternatively, at either a high level corresponding to multi-component control, or a low level corresponding to individual component control.

6. A compact workstation control room for a nuclear power plant having
   a plurality of interconnected process components defining a nuclear power generation system for generating power under normal operating conditions,
   a plurality of safety components connected to the power generation system and defining a safety system that can be activated under off-normal conditions to prevent the occurrence or mitigate the effects of an unsafe condition,
   a control room including an instrumentation and control system for monitoring and controlling the operation of the power generation system and the safety system, including,
      a power control system for the operator to regulate the components in one subset of the components of the power generation system,
      a process component control system for the operator to regulate the components in another subset of the components of the power generation system,
      a safety component control system for the operator to regulate the components of the safety system,
      a plant protection system including means operable independently of the operator, for automatically determining the onset of an unsafe condition and automatically activating some of the safety components, and
      a monitoring system for displaying to the operator, values indicative of the operating condition of the components in the power generation system and the safety system,
   wherein the improvement comprises:
   said instrumentation and control system includes man-machine workstation interface means for providing to a single operator at substantially one location in the control room, simultaneous operational access to each of the power control system, process component control system, safety component control system, plant protection system and monitoring system;
   the interface means includes four interactive screen devices for providing said operational access, respectively consisting of,
      a safety grade video display unit for monitoring the safety system,
      a safety grade control module for the operator to initiate component control action through the safety component control system,
      a non-safety grade video display unit for monitoring the power generation system, and
      a non-safety grade control module for the operator to initiate component control action through the process component control system and power control system; and
   the safety grade control module and display unit devices are implemented by independent first and second computer networks and the non-safety grade control module and display unit devices are implemented by independent third and fourth computer networks.

7. The control room of claim 6, wherein
   each of the display units includes,
      means for receiving a measurement signal from each of a plurality of components, and displaying a value of an operating parameter associated with each measurement signal to the operator commensurate with the measurement signal,
      means for selecting one of said parameters to be controlled, and for generating a selected parameter signal in response to said selection, and
   each of the control modules includes,
      means responsive to said selected parameter signal, for presenting to the operator a control actuation display screen, said screen being associated with said selected parameter,
      said control actuation display screen including touch sensitive means for the operator to transmit a component actuation signal from the control module to a component that controls said selected parameter.

8. The control room of claim 7, wherein the means for presenting a control actuation display screen includes means for storing at least one display screen associated with each of said parameters that can be selected by the operator, and touch sensitive means for the operator to select one particular screen having touch sensitive means for the operator to transmit an actuation signal to a particular component.

9. The control room of claim 6, wherein said workstation interface means includes,
   first and second, side-by-side, non-safety grade video display units, having respectively associated first and second non-safety grade control modules, whereby one operator can monitor two different operating parameters simultaneously in a respective two display units and control said different parameters at a respective two control modules.

10. The control room of claim 6, wherein
    the instrumentation and control system includes three workstation consoles, each console including said four interactive screen devices, and
    all safety control modules are implemented by said first network, all safety display units are implemented by said second network, all non-safety control modules are implemented by said third network, and all non-safety display units are implemented by said fourth network.

11. The control room of claim 10, wherein,
    two of said consoles are side-by-side for providing to a single operator at substantially one location in the control room, simultaneous operational access for all monitoring and control of the power generation system and the safety system, and the third console is spaced from said two consoles for use by another operator at a different location in the control room.

12. A workstation control room for a nuclear power plant having a plurality of inter-connected process components defining a nuclear power generation system for generating power under normal operating conditions and a plurality of safety components connected to the power generation system and defining a safety system that can be activated under off-normal conditions to prevent the occurrence or mitigate the effects of an unsafe condition, and a control room including an instrumentation and control system for monitoring and controlling the operation of the power generation system and the safety system, wherein the improvement comprises:

said instrumentation and control system includes man-machine workstation interface means including four interactive screen devices respectively consisting of,
a safety grade display unit for monitoring the safety system,
a safety grade control module for actuating components in the safety system by generating safety actuation signals and manifesting the actuation response by generating safety response signals,
a non-safety grade display unit for monitoring the power generation system, and
a non-safety grade control module for actuating components in the power generation system by generating process actuation signals and manifesting the actuation response by generating process response signals;
wherein the safety grade control module is coupled to the safety system through a first computer network, and the non-safety grade control module is coupled to the power generation system through a second, independent computer network; and
wherein the actuation signals and the actuation response signals between control modules and components are processed through one of said first and second computer networks without passing through any of the display units.

13. The compact workstation control room of claim 12, wherein the response times of the screen images on the interactive display units to changes in operating parameters is greater than about 1.0 seconds, and the screen image response times on the control modules to changes in operating parameters is less than about 1.0 seconds.

14. The compact workstation control room of claim 12, wherein
the safety system includes redundant safety components that are each controlled through one of a predetermined plurality of distinct signal processing channels, and
the safety grade control module includes means for selecting any one of said channel through which all safety actuation signals and safety response signals are processed.

15. The compact workstation control room of claim 14, wherein
the power generation system includes segmented groupings of process components, and
the non-safety grade control module includes means for selecting any one of said segmented groupings through which all process actuation signals and process response signals are processed.

16. A workstation control room for a nuclear power plant having a plurality of inter-connected process components defining a nuclear power generation system for generating power under normal operating conditions and a plurality of safety components connected to the power generation system and defining a safety system that can be activated under off-normal conditions to prevent the occurrence or mitigate the effects of an unsafe condition, and a control room including an instrumentation and control system for monitoring indicators and alarms and controlling the operation of the power generation system and the safety system, wherein the improvement comprises:

said instrumentation and control system includes man-machine workstation interface means including four interactive screen devices respectively consisting of,
a safety grade display unit for monitoring all the safety system indicators and alarms through a first computer network,
a safety grade control module for actuating components in the safety system by generating safety actuation signals and manifesting the actuation response by generating safety response signals,
a non-safety grade display unit for monitoring the power generation system through a second computer network, and
a non-safety grade control module for actuating components in the power generation system by generating process actuation signals and manifesting the actuation response by generating process response signals;
a large, vertically oriented integrated status overview board visible from substantially everywhere in the control room, for displaying
a first set of information generated by the first computer network, that is a subset of the information that can be monitored on the safety grade display unit, and
a second set of information generated by the second computer network, that is a subset of the information that can be monitored on the non-safety grade display unit.

17. The workstation control room of claim 16 wherein the safety grade control module is coupled to the safety system through a third computer network, the non-safety grade control module is coupled to the power generation system through a fourth, independent computer network, and the actuation signals and the actuation response signals between control modules and components are processed through one of said third and fourth computer networks without passing through any of the display units.

18. The workstation control room of claim 17, wherein the first set of information includes critical function alarms and primary success path alarms.

19. The workstation control room of claim 18, wherein the first set of information includes critical function indicators and primary success path indicators.

* * * * *